United States Patent [19]
LeBlanc

[11] Patent Number: 5,386,813
[45] Date of Patent: Feb. 7, 1995

[54] FUEL SAVING DEVICE

[76] Inventor: Monty J. LeBlanc, 2830C River Rd. South, Salem, Oreg. 97302

[21] Appl. No.: 137,728

[22] Filed: Oct. 18, 1993

[51] Int. Cl.$^6$ .......................................... F02M 31/00
[52] U.S. Cl. ................................................ 123/557
[58] Field of Search ............... 123/557, 549, 545, 547, 123/552

[56] References Cited

U.S. PATENT DOCUMENTS

| | | | |
|---|---|---|---|
| 1,980,496 | 11/1934 | Mussewhite | 123/557 |
| 3,968,775 | 7/1976 | Harpman | 123/557 |
| 4,030,457 | 6/1977 | Hawryluk | 123/557 |
| 4,106,457 | 8/1978 | Totten et al. | 123/557 |
| 4,259,937 | 4/1981 | Elliott | 123/557 |
| 4,275,699 | 6/1981 | Troglin | 123/557 |
| 4,318,384 | 3/1982 | Moffett | 123/557 |
| 4,356,805 | 11/1982 | Kler | 123/557 |
| 4,375,799 | 3/1983 | Swanson | 123/557 |
| 4,398,523 | 8/1983 | Henson | 123/557 |
| 4,583,512 | 4/1986 | Gardner et al. | 123/557 |
| 4,784,092 | 11/1988 | Pitti | 123/525 |
| 5,048,501 | 9/1991 | Smith et al. | 123/554 |
| 5,174,266 | 12/1992 | Evdokimo | 123/557 |
| 5,219,399 | 6/1993 | Brana | 123/557 |

Primary Examiner—E. Rollins Cross
Assistant Examiner—M. Macy
Attorney, Agent, or Firm—Eugene M. Eckelman

[57] ABSTRACT

A vaporization chamber for fuel in an internal combustion engine has a heater associated therewith that operates the chamber at an efficient super heated temperature in the range of 350° F. to 400° F. This chamber has baffles that direct an angular contoured flow path of fuel and vapors for increased exposure to the heat. The vaporization chamber is associated with heat sensors that control fire extinguishers in the event of overheating or fire. The vaporization chamber as well as its inlet and outlet are closed to atmosphere and include oxygen sensors to provide an alert in the event oxygen enters the chamber. Outlet of vaporized fuel from the chamber can be drawn into the engine by engine vacuum or in another arrangement a fan is associated with the outlet to assist this vacuum flow. Electrical controls under the influence of the vehicle throttle are provided to control the volume of flow of the vapor to the engine and by-pass of fuel to the outlet.

9 Claims, 3 Drawing Sheets

FUEL SAVING DEVICE

BACKGROUND OF THE INVENTION

This invention relates to new and useful improvements in fuel saving devices for internal combustion engines.

It has been established that improved vaporization in fuel feed systems for internal combustion engines reduces the amount of fuel power required from the engine. For example, U.S. Pat. No. 4,398,523 is concerned with improving the vaporization of fuel to increase fuel efficiency and to reduce the release of pollutants in the engine exhaust gases. The device of this prior patent heats the fuel to accomplish vaporization and employs a special carburetor in combination with the carburetor existing on the engine. The engine vacuum fuel systems such as in this former patent require a rather specific air to fuel mixture and the use of a stacked carburetor as in U.S. Pat. No. 4,398,523 creates problems in arriving at the proper mixture.

U.S. Pat. No. 4,583,512 is also concerned with improving vaporization of fuel for feeding fuel to the intake manifold of an internal combustion engine. The structure of this patent heats a mixture of fuel and air to provide vaporization. In essence, such structure comprises a complicated carburetor requiring performance of a plurality of valves and other control means.

Other fuel treatment devices relating to vaporizing fuel by heat are shown in U.S. Pat. Nos. 4,318,384, 4,259,937, 4,784,092, 5,048,501, and 5,174,266.

SUMMARY OF THE INVENTION

An object of the invention is to provide structure accomplishing improved vaporization of fuel for internal combustion engines.

More particular objects are to provide a system of fuel feed for internal combustion engines that employs a super heated vaporization chamber providing complete vaporization of the fuel for improved fuel economy; that can be used in combination with fan means that draw the super heated vapor from the vaporization chamber and feed it to the intake manifold of an engine; that provides electro and mechanical controls having their operation influenced by the accelerator of the engine for precise feeding of the vapor to the intake manifold; that includes bypass means for balancing the pressure in the feeding portion of the system; that employs fire suppression means responsive to fire and collision sensors; and that is readily installable onto existing systems.

In carrying out these objects, the fuel line from the fuel tank of the vehicle is connected into a super heated vaporization chamber for feeding to the engine manifold. The fuel is forced into the vaporization chamber by a first stage pump comprising a conventional fuel pump. The vaporization chamber may be associated with an outlet communicating with a second stage variable high speed pump employing twin, counter-rotating fans. This pump draws vapor from the vaporization chamber and feeds it to the intake manifold through butterfly valve means. The accelerator of the vehicle is equipped with auxiliary linkage means connected to electro-mechanical linkage that operates the butterfly valve means and other controls for the selected feed of fuel or vapor, for the speed of the second stage pump, and for bypass of the vaporization chamber when a rich fuel condition is called for. The present system also has means for disabling it and allowing the existing fuel feed means of the engine to be independently operable. The fire suppression means include sensors selectively located in the fuel feed system and also on other parts of the vehicle and arranged to activate the suppression means in the event of fire or collision. The present structure employs a base plate at its discharge end that can be inserted between the existing intake manifold and carburetor.

The invention will be better understood and additional objects will become apparent from the following description taken in connection with the accompanying drawings.

DETAILED DESCRIPTION OF PREFERRED EMBODIMENTS

Figure 1:
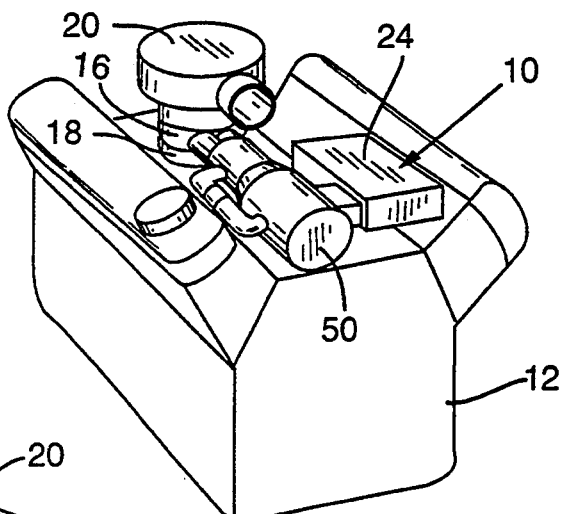
FIG. 1 is a perspective view of a vehicle V-type engine having the present fuel saving device mounted thereon.
Figure 2:
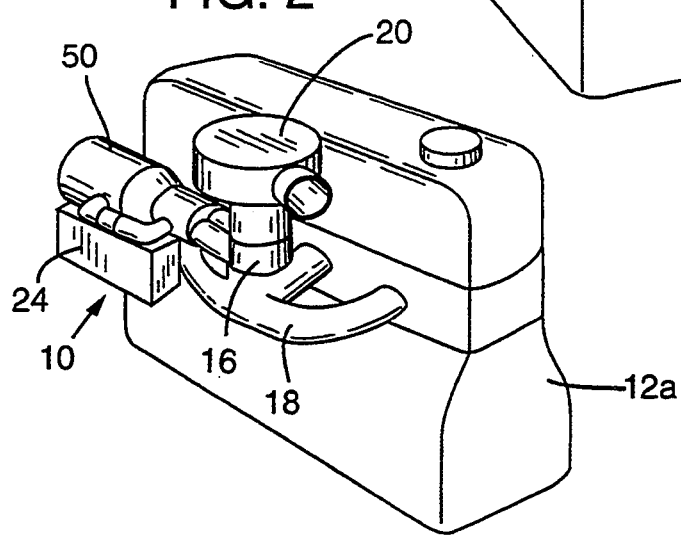
FIG. 2 is a view similar to FIG. 1 but showing the present invention mounted on an in-line engine.

With particular reference to the drawings and first to FIGS. 1 and 2, the present invention, designated generally by the numeral 10, is shown mounted on conventional internal combustion engines. FIG. 1 shows its adaptation to a V-type engine 12 and FIG. 2 shows its adaptation to an in-line engine 12a. In each case, the output of the invention comprises an apertured base member 16 arranged to be mounted between a manifold 18 and a carburetor 20. The securement between the manifold and carburetor of conventional internal combustion engines comprises a bolted connection, and the base member 16 of the invention is preselected in construction to be bolted between these two fuel line members. Since the invention is on the downside of the carburetor, it is apparent that air intake into the fuel feed system from the carburetor is not disturbed or changed by the present invention. Therefore, it is to be understood that the invention is associated only with vaporizing the fuel and presenting the vapor to the intake manifold, such vapor at the manifold being mixed with the air from the carburetor in a conventional but supplemental manner, as will now be described.

Figure 3:
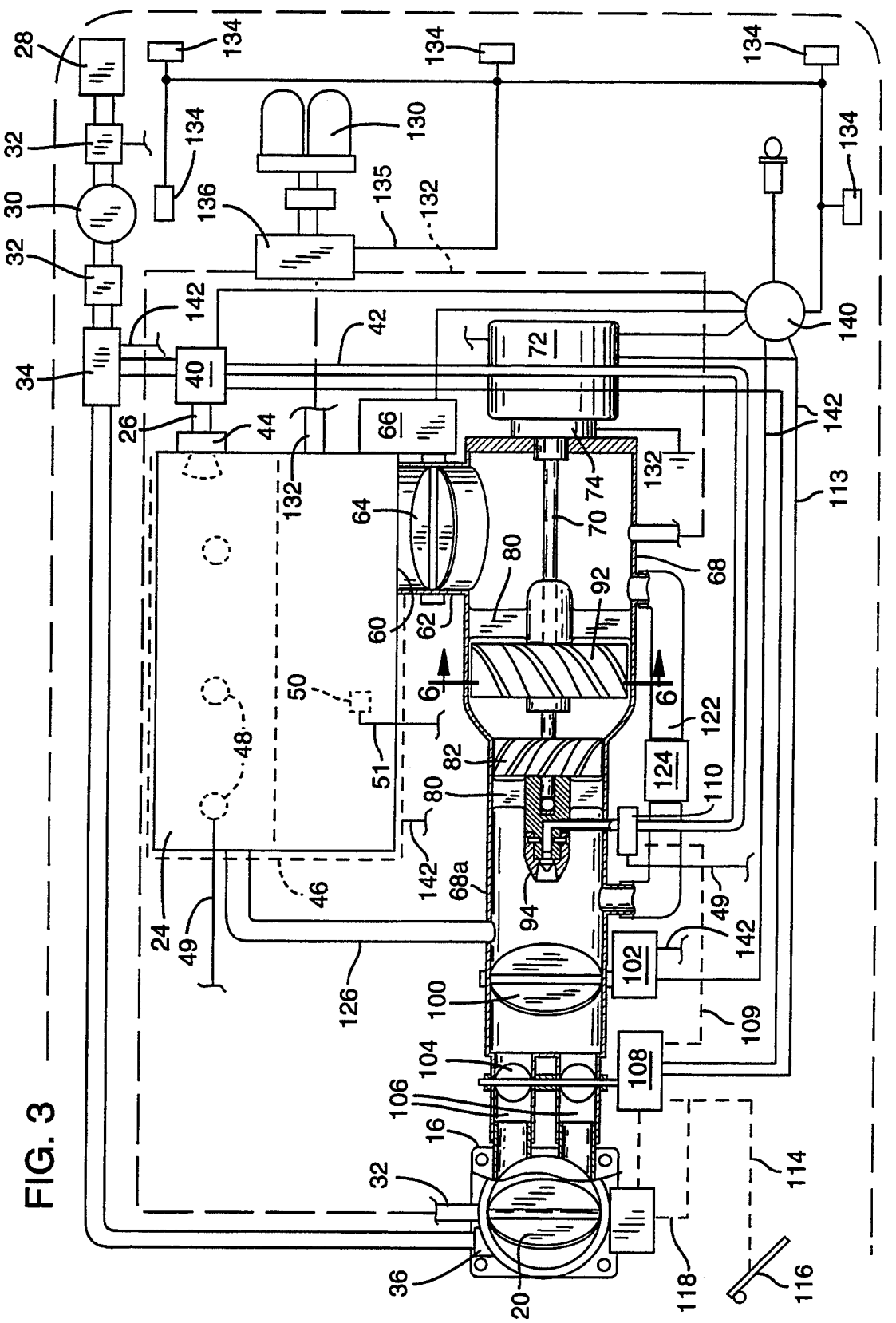
FIG. 3 is a schematic view showing the present fuel saving device, portions of this view being structurally detailed.

With reference now to FIG. 3, the invention employs an improved fuel vaporization apparatus that greatly increases fuel efficiency. It comprises a vacuum vaporization chamber 24 having a fuel inlet conduit 26 leading into one end thereof. The other end of conduit 26 leads to the vehicle fuel tank 28 and includes a conventional electronic fuel pump 30 therein as well as filters 32 on opposite sides of the pump. Conduit 26, between the fuel supply 28 and the vacuum vaporization chamber 24, also includes an electronically controlled 3-way main control valve 34 which can route raw fuel either to the vacuum vaporization chamber 24 or directly to the carburetor 20 through a conduit 26a. For purposes of the invention, a suitable connection 36 is made at the carburetor. The flow of fuel from 3-way valve 34 to the vacuum vaporization chamber 24 is also controlled by a second electronically controlled 3-way diverter valve 40, this latter valve being solenoid operated and arranged to direct flow of fuel to the chamber 24 or to a conduit 42 in a performance condition of the apparatus to be described. Conduit 26 is connected into chamber 24 at a spray nozzle 44.

Vacuum vaporization chamber 24 is associated with heating means 46 having the capability of super heating the chamber to the vapor point of hydrocarbon fuel, namely, from 350° F. and above and preferably up to about 400° F. The chamber has thermocouples 48 associated therewith that sense the temperature and maintain the chamber in its super heated condition. These thermocouples are in circuitry 49. The temperature in the chamber can be maintained at a desired range by the thermocouples. The chamber 24 includes an oxygen sensor 50 and circuitry 51 therefor, the purpose of which will be described.

Figure 4:
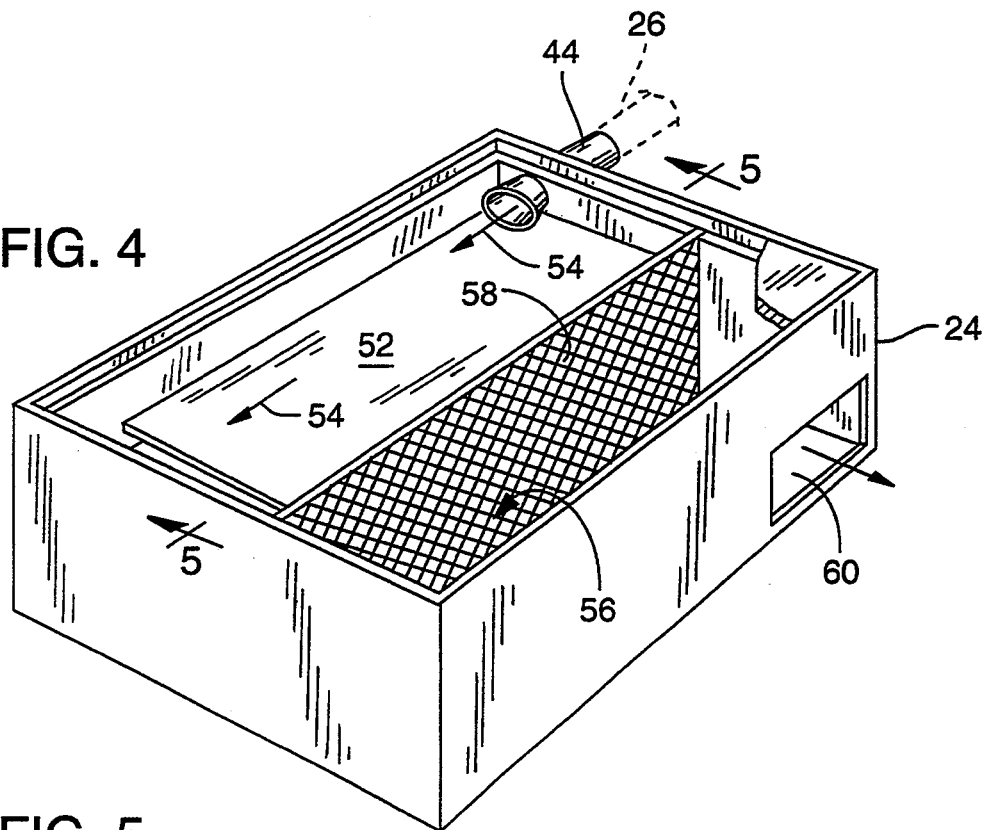
FIG. 4 is a perspective view of the vaporization chamber, a wall portion of this chamber being broken away to show inner details.
Figure 5:
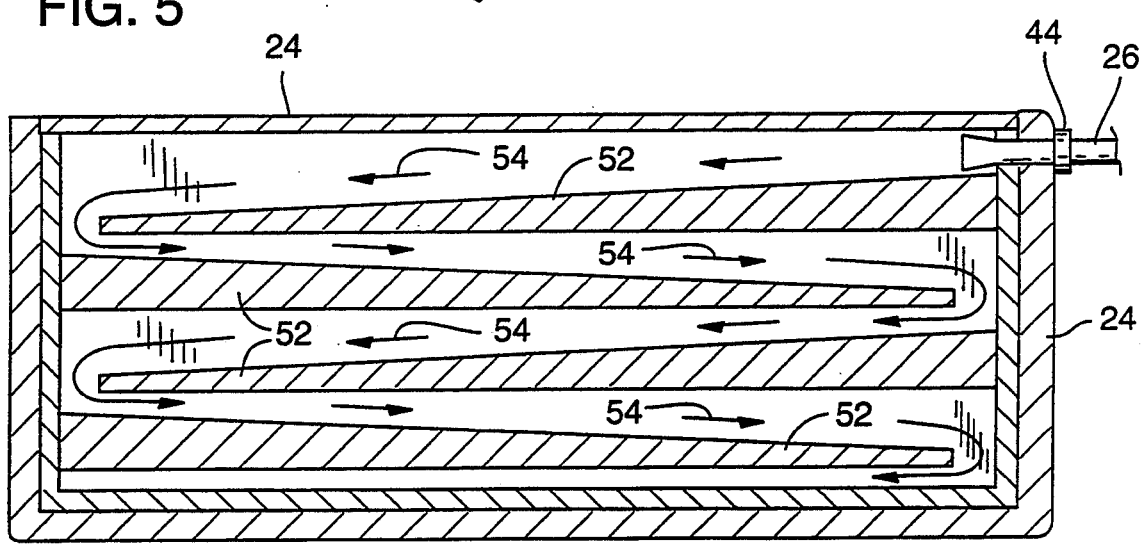
FIG. 5 is a cross sectional view of the vaporization chamber taken on the line 5—5 of FIG. 4.

The chamber 24 has a plurality of substantially parallel spaced baffles 52, FIGS. 4 and 5, of alternately tapered thickness and foreshortened at alternate ends to form an elongated circuitous route for vapors to travel from injector inlet 44 to the opposite side of the chamber as indicated by the arrows 54. The baffles do not extend the full width of the chamber 24 and form a side compartment 56 having a screen 58 covering the open side edge portion of the chamber. Screen 58 is of fine mesh to catch any foreign particles.

Figure 6:
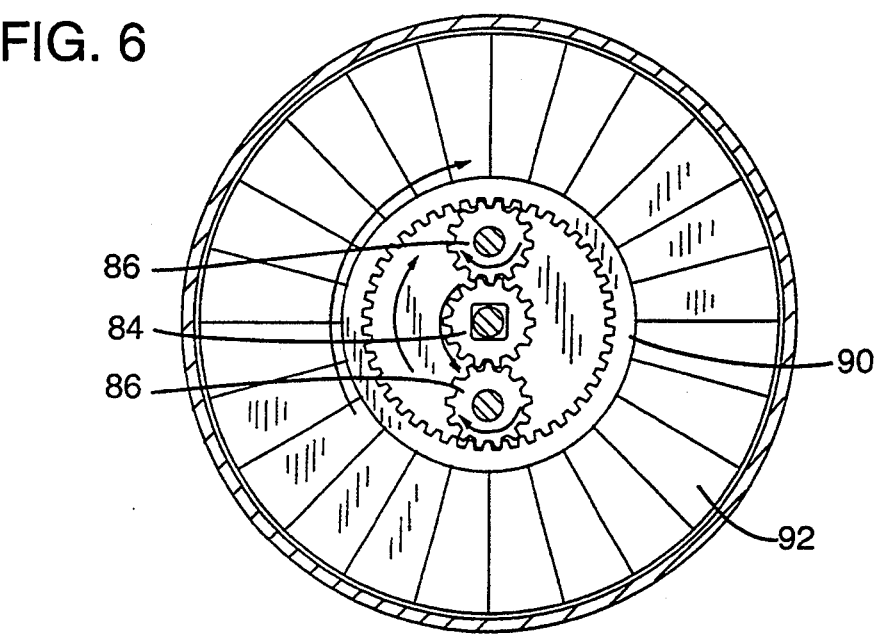
FIG. 6 is a section view taken on the line 6—6 of FIG. 3.

Side compartment 56 has an outlet 60, FIGS. 3 and 5 that communicates with an enlarged, short conduit portion 62 and that houses a butterfly valve 64 controlled by a solenoid operated switch 66 capable of providing open or closed position of the valve. Valve 64 establishes communication between outlet 60 of chamber 24 and a tubular pump chamber 68. A shaft 70 extends axially through the chamber 68 and supports a second stage variable speed pump 72 mounted exteriorly of the chamber and capable of driving shaft 70 at high speeds, namely, from 12,000 to 20,000 r.p.m. Pump 72 has a shaft brake 74 associated therewith. Shaft 70 is journaled at the end opposite from the motor in forward and rearward spider mounts 80 secured integrally within the pump chamber 68. The shaft supports a forward fan 82 of the pump for unitary rotation and similarly supports a rearward pinion gear 84, FIG. 6. Gear 84 meshes with a pair of driven gears 86 rotatably supported on stub shafts 88 supported on rear spider mount 80 and meshing with an internal ring gear 90 integral with a fan 92 of the pump 71. This gear arrangement provides an opposite direction of rotation of the two fans 82 and 80. The counter rotating fans have opposite angled blades which draw vapors from the vapor chamber 24 and push the vapors into the manifold of the carburetor.

Fan 82 is housed in a reduced size portion 68a of chamber 68, and a second stage atomizing injector nozzle 94 projects forward from the shaft that has fuel communication with fuel tank 14 by conduit 42 which leads from 3-way valve 40. Conduit 42 provides an alternate fuel route to chamber 68a from the fuel tank as determined by operation of electronically controlled valves 34 and 40 in operative functions to be described.

Chamber 68a also houses a first stage butterfly valve 100 movable into on and off positions by a solenoid operated switch 102. Chamber 68a leads through valve 100 to a variable aperture second stage or throttle valve 104 that controls the vapor inlet to outlets 106 leading into the inlet manifold 18 of the engine. Valve 104 is operated in variable positions by a potentiometer-controlled mechanical linkage assembly 108 that also controls, by circuitry 109, on-off flow of fuel from valve 40 to a solenoid operated valve 110 in conduit 42 and in turn to the injector nozzle 94.

Linkage assembly 108 is also mechanically connected by links 114 to the accelerator pedal 116 of the vehicle and electrically connected to diverter valve 40 by the circuitry 109 and to pump drive motor 72 by circuitry 113. The numeral 118 designates the existing linkage between the accelerator pedal 116 and the carburetor for operating the existing system of the vehicle apart from the present system.

As will be more apparent hereinafter, the second stage pump chamber 68a will operate under a vacuum and chamber 68 will be pressurized. These two chambers are connected by a bypass conduit 122 in which a pressure relief valve 124 is mounted whereby in the event chamber 68a exceeds a maximum of a desired outlet pressure, such pressure can be released into chamber 68.

Pump chamber 68a has a condensation return conduit 126 leading to the vacuum vapor chamber 24. Fuel condensation which may form in fan chamber 68a will be returned to the vapor chamber for re-processing. In view of the vacuum condition of the chamber 24 and the pressured condition of chamber 68a, condensation is efficiently cleared out and re-vaporized.

The present system has fire suppression means, comprising a central pressurized container 130 of fire retardant material having communication by suitable conduit means 132 leading to the vacuum chamber 24, to the pump chamber 68, and to the carburetor 20. Sensors 134 and circuitry 135 are in this fire suppressing system for activating the system by means of a release valve 136 in the event of a collision. Sensors 134 in the circuitry 135 are arranged to activate the fire suppressing system in the event of fire. These sensors can also be of a type that sense an impact so as to activate the system in the event of accident and thus avoid a fire. The present system employs an ignition switch 140 that includes a warm-up position and a motor start position, the switch having operable connection to elements of the system that will become apparent in the description of operation.

OPERATION

Elements of the present system are controlled in on and off conditions by the ignition switch 140 and circuitry 142 therefor. In the off position of the ignition switch, solenoid operated switch 102 maintains the valve 100 in a closed position. Also, solenoid operated switch 66 holds valve 64 closed and the potentiometer-controlled mechanical linkage assembly 108 holds the valve 104 closed. Main control valve 34 is closed in its deenergized condition as is diverter valve 40. Solenoid operated valve 110 in conduit 42 is also closed. Electronically operated main fuel pump 30 is off.

When the ignition switch is turned to its warm-up position, fuel pump 30 is energized. The heating element 46 of the vaporization chamber 24 is also energized. The main control valve 34 opens the fuel line 26 to the diverter valve 40. This latter valve also is activated to direct raw fuel into the vaporization chamber 24. Valve 100 in pump chamber 68a is opened by its control 102 and valve 64 is opened by its control 66. The potentiometer controlled linkage 108 is activated and made ready for throttle operation. This pre-start condition may take a short time before the vaporization chamber is heated and before the engine is started, and suitable circuitry from the thermocouples associated with its circuitry 49 may be provided with a signal on the dashboard of the vehicle to designate readiness.

The ignition switch 140 is then turned to its motor start position. At this same time, the accelerator is depressed. This initial function of potentiometer-controlled linkage assembly 108 opens valve 40 to conduit 42 and also the solenoid operated valve 110 to supply raw fuel around the secondary pump for flow through nozzle 94 to the carburetor. When the engine starts, the alternator of the engine drives the pump motor 72. As the temperature nears the operating temperature of the thermocouples, valve 110 as controlled by thermocouple circuitry 49 shuts off. Thus the pump 71 is capable of providing all the fuel from the vaporization chamber without the necessity of assistance from injector nozzle 94. As the throttle requirement increases, linkage assembly 108 causes the pump 72 to increase in speed and this secondary pump is capable of drawing vapor to maintain the desired 14.7 to 1 fuel-air ratio. On hard acceleration, linkage 108 causes valves 40 and 110 to open and feed raw fuel to the injector nozzle 94. These valves close as soon as the throttle requirement returns to normal. Main control valve 54 is programmed with its circuitry 144 such that under normal conditions it directs fuel to diverter valve 40 but in the event of failure of the present system or by intentional shut-off of the present system, it will direct fuel around said system and deliver it direct to the carburetor.

Features of the invention are as follows:

It has means that vaporizes fuel in a chamber 24 heated in super heated relation, namely, between 350° F. and 400° F. for complete vaporization. These complete vapors may be fed directly into the manifold under the influence of the engine vacuum and used as needed. The influence of the engine vacuum on the vaporized fuel causes the boiling point of the fuel to lower and thus accomplish more complete vaporization. In an auxiliary form this highly vaporized fuel is drawn off by vacuum from the second stage, high speed, counter rotating twin fan vapor pump 71 which maintains vaporization and presents the vaporized fuel to the vehicle fuel system. Upon hard acceleration, the atomizing fuel injector is activated and fuel is fed directly into the system. The vacuum condition created by the second stage pump lowers atmospheric pressure within the vaporization chamber 24, resulting in highly efficient liquid vapor transfer rate and lowering the boiling and vapor points of the fuel. The system is a closed system with vapor only and with no oxygen whereby to reduce the hazard of fire. In fact, the oxygen sensor 50 in the vapor chamber alerts the operator as to the existence of oxygen and the system can be shut down for repair. The present system also allows backup use of the existing vehicle fuel system in the event of failure. The second stage pump 71 can be set at a speed according to the intake capacity of the carburetor CFM rating, based upon an ideal mixture ratio of 14.7 to 1, with allowances for mixture and rich needs for acceleration purposes. The sensors 134 can be heat or collision sensors to release fire retardent into the vapor chamber 24, the second stage pump chamber 68, and the intake manifold to eliminate the possibility of fire.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. Fuel saving device for internal combustion engines having a fuel pump, fuel mixing means for mixing fuel and air to be fed to the engine, and a throttle, said fuel saving device comprising:

a vaporization chamber having an inlet and an outlet, fuel line means capable of connecting the inlet of said chamber in communication with the pump for receiving fuel to be vaporized, heating means associated with said vaporization chamber for heating said chamber to substantially an upper limit of 400° F. for complete vaporization of the fuel, means associated with the outlet of said vaporization chamber directing said heated vaporized fuel to the vehicle engine manifold, and heat sensors in said fuel saving device and fire extinguishing means disposed at selected positions in said device under the control of said sensors.

2. Fuel saving device for internal combustion engines having a fuel pump, fuel mixing means for mixing fuel and air to be fed to the engine, and a throttle, said fuel saving device comprising:

a vaporization chamber having an inlet and an outlet, fuel line means capable of connecting the inlet of said chamber in communication with the pump for receiving fuel to be vaporized, heating means associated with said vaporization chamber for heating said chamber for complete vaporization of the fuel, and fan means associated with the outlet of said vaporization chamber directing said heated vaporized fuel to the vehicle engine manifold, said fan means including twin fans operating in opposite directions.

3. The fuel saving device of claim 2 wherein said vaporization chamber includes baffle means that provide a tortuous path for the raw fuel in the heated interior of said chamber for efficient vaporization.

4. The fuel saving device of claim 2 wherein said inlet to the vaporization chamber as well as the vaporization chamber and its outlet are closed to atmosphere, and oxygen sensing means in said chamber.

5. The fuel saving device of claim 2 wherein said outlet of said vaporization chamber has an electrically controlled valve therein for controlling the volume of vapor flow to the fuel mixing means of the engine, and electrical control means capable of connection to said valve and operative under the influence of the engine throttle to control fuel vapor flow to the engine.

6. The fuel saving device of claim 5 including auxiliary fuel inlet means in said outlet, said electrical control means also being operative under the influence of the engine throttle to add fuel to said outlet.

7. Fuel saving device for internal combustion engines having a fuel pump, fuel mixing means for mixing fuel and air to be fed to the engine, and a throttle, said fuel saving device comprising:

a vaporization chamber having an inlet and an outlet, fuel line means capable of connecting the inlet of said chamber in communication with the pump for receiving fuel to be vaporized, heating means associated with said vaporization chamber for heating said chamber to substantially an upper limit of 400° F. for complete vaporization of the fuel, means associated with the outlet of said vaporization chamber directing said heated vaporized fuel to the vehicle engine manifold, said inlet to the vaporization chamber as well as the vaporization chamber and its outlet being closed to atmosphere, and oxygen sensing means in said chamber.

8. Fuel saving device for internal combustion engines having a fuel pump, fuel mixing means for mixing fuel and air to be fed to the engine, and a throttle, said fuel saving device comprising:

a vaporization chamber having an inlet and an outlet, fuel line means capable of connecting the inlet of said chamber in communication with the pump for receiving fuel to be vaporized, heating means associated with said vaporization chamber for heating said chamber to substantially an upper limit of 400° F. for complete vaporization of the fuel, means associated with the outlet of said vaporization chamber directing said heated vaporized fuel to the vehicle engine manifold, said outlet of said vaporization chamber having an electrically controlled valve therein for controlling the volume of vapor flow to the fuel mixing means of the engine, and electrical control means capable of connection to said valve and operative under the influence of the engine throttle to control fuel vapor flow to the engine.

9. The fuel saving device of claim 8 including auxiliary fuel inlet means in said outlet, said electrical control means also being operative under the influence of the engine throttle to add fuel to said outlet.

* * * * *